Patented Dec. 12, 1922.

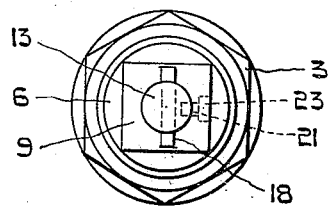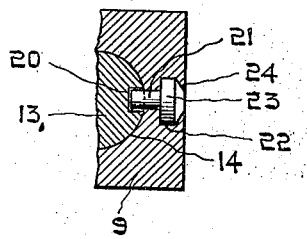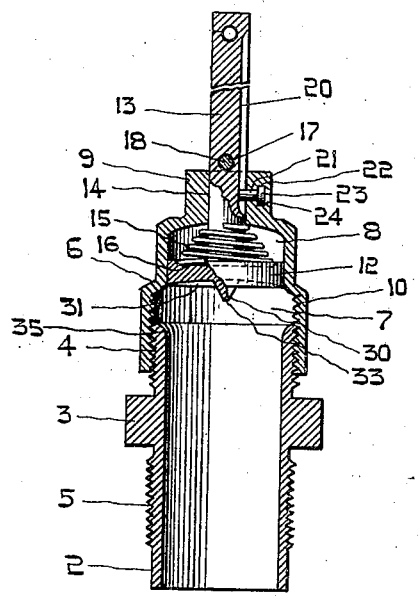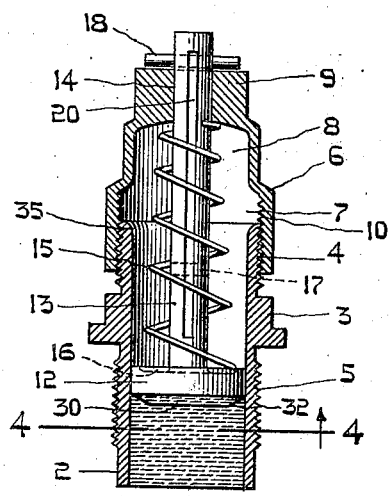

1,438,384

UNITED STATES PATENT OFFICE.

JAMES LEES, OF MONTREAL, QUEBEC, CANADA.

GREASE CUP.

Application filed April 29, 1921. Serial No. 465,616.

*To all whom it may concern:*

Be it known that I, JAMES LEES, of the city of Montreal, Province of Quebec, Dominion of Canada, a subject of the King of Great Britain, have invented certain new and useful Improvements in Grease Cups; and I do hereby declare that the following is a full, clear, and exact description thereof.

My invention relates particularly to self-feeding grease cups, and more particularly to those of the plunger type.

Heretofore in applying grease to a joint which has been overhauled particularly in locomotive or automobile work, great difficulty has been experienced in the self-feeding grease cups in common use, in forcing the grease to the joint as it is essential that the grease be squeezed in between the members thereof before being put into use again. This difficulty was usually overcome in the plunger type of cup by driving the plunger inwardly with a hammer or the like. As a result of this rough usage the cap usually was damaged and either jammed on or loosened to such an extent that it very often dropped off.

A further difficulty experienced was that the means for maintaining the cap in position upon the body of the cup did not always act, and the cap was apt to become dislodged when in use.

The object of my invention is to overcome these difficulties by providing a self-feeding grease cup which may be converted into a manually operated compression cup thereby enabling the body and cap to be filled with grease and permitting of the forcing of the grease inward to the joint by a manual screw action without damage to the grease cup. A further object of my invention is to provide a construction having a minimum number of parts and which may be manufactured at reduced cost.

For full comprehension, however, of my invention reference must be had to the accompanying drawing in which similar reference characters indicate the same parts and wherein:

Figure 1 is a vertical sectional view of a grease cup constructed according to my invention and illustrates the plunger in its outermost position;

Figure 2 is a vertical sectional view taken at right angles to Fig. 1 and illustrating the plunger in its innermost position;

Figure 3 is a detail view of the cap and plunger removed;

Figure 4 is a transverse sectional view taken on line 4—4 Fig. 2;

Figure 5 is a plan view of the cap;

Figure 6 is a detail sectional view illustrating particularly the pin for preventing relative rotation between the plunger rod and the cap.

My improved grease cup consists of a cylindrical body member 2 presenting a smooth interior and having a hexagonal collar 3 formed integrally therewith and threaded portions 4 and 5 for respectively screwing the cap 6 thereon and attaching the cup to the portion of the frame to be lubricated. The cap 6 is of hollow form similar to the standard compression cups in common use with the exception that it has an inward extension 8 of the usual grease chamber 7, and is provided with a rectangular head 9. The inner wall of the chamber 7 is screw-threaded as at 10 for engagement with the threads on the end 4 of the body.

The self-feeding means consists of a plunger 12, the rod 13 of which projects through a boring 14 in the rectangular head 9 and is slidable therein, while encircling the plunger rod and bearing between the cap and the plunger is a helical spring 15. This spring is constructed and arranged to exert constant pressure upon the plunger for the purpose of feeding grease to the joint as required, the plunger being recessed as at 16 to present a spring seat for the spring 15 and provide a chamber for accommodating the spring when the plunger is in its extreme outward position relatively to the cap. When in this position the plunger is adapted to be contained within the chamber 8 which is of such a diameter that it will accommodate the same with a sliding fit, the diameter of such chamber being substantially the same as that of the fore of the body 2. The purpose in providing the auxiliary chamber 8 is to present a clear space within the chamber for grease when refilling, in the latter operation both the chamber in the body 2 and chamber 7 in the cup being packed with grease and the cap then screwed upon the end 4 of the body. This forces the grease to and around the members of the joint and eliminates the necessity of striking the outer end of the plunger. The rectangular head 9 enables a wrench to be used in turning the cap. It is necessary to provide means for maintaining the plunger within the chamber 8, with the spring compressed as indicated in Fig. 1, and to this end rod 13 is provided with a transverse boring 17 through which a pin 18 of greater length than the diameter of the rod may be inserted, the projecting ends of the pin being constructed and arranged to engage the rectangular head and prevent inward movement of the plunger relatively thereto. In order to provide means for locking the cap in position upon the body when in use, relative rotary movement between the plunger rod and cap is prevented by the longitudinal featherway or groove 20 in the plunger rod and a pin 21 projecting thereunto and constituting a key or feather, this pin is mounted in a boring in the rectangular head 9, the outer end of the boring being of increased diameter to present a shoulder 22 against which the head 23 of the pin 21 is adapted to abut thereby preventing the inner end of the pin engaging the bottom of the groove and interfering with axial movement of the plunger rod. Displacement of this pin is prevented by an annular lip 24, produced by swedging the outer end of the boring accommodating the pin over the head thereof. Relative rotary movement between the body and the plunger is prevented by a diametrical rib 30 of triangular cross section formed integrally upon the face of the plunger in contact with the grease which face is dished as at 31. This rib is sheared off at its ends as at 32 and presents a knife edge 33 constructed and arranged to bite into the grease.

It will be seen that when the plunger is bearing upon the grease under the influence of spring 15 the rib will be embedded in the grease and will prevent rotation of the plunger and as the cap cannot turn independently of the plunger it also will be locked. When it is desired to remove the cap the plunger is first pulled outwardly until the boring 17 in the plunger rod is clear of the rectangular head, the pin 18 being then inserted. The cap may then be removed by unscrewing.

The mouth of the body portion 2 is flared as at 35 to facilitate the entry of the grease thereinto.

What I claim is as follows:

1. In a grease-cup the combination with a body portion presenting substantially uniform bore throughout the same and a unitary cap screwed thereon; of means for locking said cap against rotation relatively to said body, said means including a device locked against rotation relatively to the cap and constructed and arranged to be embedded in the grease.

2. In a grease cup the combination with the body thereof presenting substantially uniform bore to and through its discharge opening and a unitary cap screwed upon the body, and means constructed and arranged to exert pressure upon the grease toward the discharge end of the grease-cup, said means including a member slidably mounted in the cap and locked against rotation relatively thereto and having a portion constructed and arranged to be embedded in the grease for the purpose of preventing accidental displacement of the cap when in use.

3. In a self-feeding grease-cup the combination with the body thereof presenting substantially uniform bore to and through its discharge opening and a unitary cap screwed upon the body, said cap having a grease chamber and an auxiliary chamber constituting an extension of the first-mentioned chamber; of means constructed and arranged to exert pressure upon the grease toward the discharge end of the grease-cup, said means including a plunger and a plunger-rod slidably mounted in the cap, the auxiliary chamber being adapted to accommodate the plunger in one position for the purpose of presenting a clear space in the grease chamber, and means for maintaining the plunger in said position consisting of a removable pin adapted to be inserted through a transverse hole in the plunger in position to engage the top of the cap.

4. In a self-feeding grease-cup the combination with the body thereof presenting substantially uniform bore to and through its discharge opening and a cap screwed upon the body of combined means for exerting pressure upon the grease toward the discharge end of the grease-cup and for locking the cap against rotation relatively to the said body.

5. In a self-feeding grease-cup the combination with the body thereof presenting substantially uniform bore to and through its discharge opening and a cap screwed upon the body, of combined means for exerting pressure upon the grease toward the discharge end of the grease-cup and for locking the cap against rotation relatively to the body, said means consisting of a plunger-rod slidably mounted in said cap, a plunger mounted upon the inner end of said plunger-rod, a spring encircling said plunger-rod and bearing between the plunger and said cap, a projection upon the face of the plunger in contact with the grease and adapted to be embedded in the grease, said projection being tapered to present a blunt knife edge which readily cuts into the grease and a feather upon the cap and engaging a longitudinal feather-way in the plunger-rod.

6. In a self-feeding grease-cup the combination with the body thereof presenting substantially uniform bore to and through its discharge opening and a cap screwed upon the body, said cap having a grease chamber and an auxiliary chamber constituting an extension of the first-mentioned chamber, of combined means exerting pressure upon the grease towards the discharge end of the cup and for locking the cap against rotation relatively to the body, said means consisting of a plunger rod mounted in said cap, a plunger mounted on the inner end of said plunger-rod, a spring encircling said plunger-rod and bearing between the plunger and said cap, a rib upon the face of the plunger in contact with the grease said rib being adapted to be embedded therein, a feather upon the cap and engaging a longitudinal feather-way in the plunger-rod and means for maintaining the plunger in position within the auxiliary chamber, said means consisting of a transverse opening in said plunger-rod and a pin of greater length than the diameter of said rod and constructed and arranged to be inserted through said opening with its ends engaging said cap.

In testimony whereof I have signed my name to this specification in the presence of two witnesses.

JAMES LEES.

Witnesses:
GORDON G. COOKE,
WILLIAM J. C. HEWETSON.